(12) United States Patent
Iwata

(10) Patent No.: US 6,286,636 B1
(45) Date of Patent: Sep. 11, 2001

(54) DISC BRAKE

(75) Inventor: Yukio Iwata, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/433,305

(22) Filed: Nov. 3, 1999

(30) Foreign Application Priority Data

Nov. 4, 1998 (JP) .................................................. 10-313532

(51) Int. Cl.[7] .................................................. F16D 55/00
(52) U.S. Cl. .................................. 188/73.31; 188/73.36; 188/73.38
(58) Field of Search .............................. 188/73.31, 73.35, 188/73.36, 73.37, 73.38, 73.39

(56) References Cited

U.S. PATENT DOCUMENTS

| | | | |
|---|---|---|---|
| 3,920,104 | * 11/1975 | Hoffmann | 188/73.31 |
| 4,940,119 | * 7/1990 | Kondo et al. | 188/73.31 |
| 5,125,482 | * 6/1992 | Negishi | 188/73.38 |
| 5,535,856 | * 7/1996 | McCormick et al. | 188/73.36 |

FOREIGN PATENT DOCUMENTS 9-79296  3/1997  (JP) .

\* cited by examiner

Primary Examiner—Robert Oberleitner
Assistant Examiner—Melanie Torres
(74) Attorney, Agent, or Firm—Morgan, Lewis & Bockius LLP

(57) ABSTRACT

A disc brake comprises pads, a support member, elastic members, and a caliper. The pads include first engaging portions having first slanted surfaces with a first distance therebetween. The support member straddles the rotor and is supported on a body. The support member includes a pair of second engaging portions having second slanted surfaces. The second slanted surfaces have a second distance therebetween. The elastic member, disposed on the pads, presses the pads in a direction which shortens a third width defined by an adjacent pair of the first and second slanted surfaces, respectively. The first and second distances change gradually along the first and second slanted surfaces. Engaging protrusions are provided to one of the pairs of the first and second engaging portions, each including a first width. Engaging grooves are provided to the other of the pairs of the first and second engaging portions, each including a second width.

13 Claims, 5 Drawing Sheets

DISC BRAKE

BACKGROUND OF THE INVENTION

1. Field of the Invention

The present invention relates to a disc brake for a vehicle. More particularly, the invention relates to a structure of the disc brake which is capable of preventing an abnormal sound from being generated, when the disc brake is operated, at an engaging portion where a pad and a support portion, which are assembled into the disc brake, engage with each other.

2. Description of the Related Art

A disc brake having a structure as shown in FIGS. 6 and 7 is known as a disc brake for a vehicle. The disc brake is disclosed in JP-A-9-79296. As shown, a support member 2 is disposed close to a part of a rotor 1, which rotates together with a wheel (not shown) of the vehicle. The support member 2 is firmly supported on a suspension device (not shown) provided on the vehicle body side. The support member 2 supports a caliper 3 in a state that the caliper 3 is movable in the axial directions of the rotor 1 (the axial direction is back-and-forth direction, in other words, direction vertical to the drawing surface of FIG. 6, or is vertical direction when viewed in FIG. 7). A pair of run-in and run-out side support portions 4 and 5 are located at both ends of the support member 2, while being spaced apart from each other in the circumferential direction of the rotor 1. The top ends of those support portions 4 and 5 are each bent to be shaped like U. Each of the support portions 4 and 5 is disposed astride the outer peripheral portion of the rotor 1 in the vertical direction in FIG. 6 (in other words, vertical direction when viewed in FIG. 7). The first ends of pads 6 are supported by the run-in side support portion 4, while being slidable in the axial direction of the rotor 1. The second ends of those pads 6 are supported by the run-out side support portion 5, while being also slidable in the axial direction. The run-out side support portion 5 receives brake torque, which is generated, when the braking is effected, by friction of the pads 6 against the side surfaces of the rotor 1 and act on those pads 6. In the embodiment, the run-out side support portion 5 is located at the run-out side end (in other words, left end in FIGS. 6 and 7 when the rotor 1 is rotated from the right side to the left side, in the direction "a" of an arrow in FIGS. 6 and 7).

Engaging protrusions 8 are protruded from both ends of a back plate 7 of each pad 6. Engaging grooves 9 are formed in the inner side surfaces of the run-in side and run-out side support portions 4 and 5, respectively. The engaging protrusions 8 are respectively brought into contact with the engaging grooves 9 such that the engaging protrusions 8 are movable in the axial direction of the rotor 1, and the engaging portions will be referred to as a run-in engaging portion and a run-out engaging portion. Thus, the pads 6 are respectively movable to and from the side surfaces of the rotor 1, while being supported on the support member 2.

The caliper 3 is supported by the support member 2 while straddling the pair of the pads 6. The caliper 3 is provided with cylinder portions 10 and caliper claws 11. The cylinder portions 10 include pistons for pressing the pads 6 against the rotor 1.

Pad clips 12, which is formed with an elastic metal plate, for example, a stainless steel plate, are provided at the portions of the support member 2 where the support member supports both ends of the pads 6. The pad clips 12 elastically press the pads 6 to thereby prevent unsteady motions of those pads, which is caused by rattling during the vehicle running. Each of the pad clips 12 partly covers the inner surface of the corresponding engaging groove 9. In this case, a small clearances 13 exist between the part of the pad clip 12 where the pad clip covers the inner surface of the engaging groove 9 and the corresponding engaging protrusion 8. The clearances 13 are dimensionally selected so as to secure smooth displacement of the pads 6 in the axial direction of the rotor 1 in a normal state, and further even when the back plates 7 and/or the support member 2 are varied in dimension. The back plates 7 are formed with stainless steel plates and the support member 2 is made of cast iron. Accordingly, those component parts become rusty. In this case, the resultant products somewhat vary the dimensions of those and related component parts. For example, the corrosive products formed on the back plates 7 yield slight dimension increase of the back plates 7 or the outside dimensions of the engaging grooves 9 are also somewhat varied.

In the conventional disc brakes having the structure shown in FIGS. 6 and 7, the clearances 13 are selected to be wide enough to allow the pads 6 to smoothly displace in the axial directions of the rotor 1 even when the outer periphery edge of the back plates 7 and/or the support member 2 made of cast iron are rusted, and as a result, the back plates 7 increase their dimensions and the engaging grooves 9 decrease their dimensions. With use of such clearances 13, the pads 6 sometimes rapidly moves with respect to the support member 2. When the disc brake is operated for braking the vehicle, the pads 6 come into frictional engagement with the rotor 1, and are displaced in the circumferential direction of the rotor 1. At this time, the clearances 13 associated with the run-out side support portion 5 disappear, while at the same time the back plates 7 impact against part of the pad clips 11, to thereby generate a beat sound, called a cronk sound. Also when the disc brake is not operated, the pads 6 displace while resisting the elastic force by the pad clips 12, to sometimes generate noisy vibrations called rattle sounds. Increasing the elastic forces of the pad clips 12 may prevent generation of such noisy vibrations. However, this approach is not desirable for the following reasons. The elastic force increase makes the assembling work of the disc brake complicated, and further restricts movements of the pads 6, and hence a drag resistance increases between the pads 6 and the rotor 1 in a non-braking mode.

SUMMARY OF THE INVENTION

Accordingly, an object of the present invention is to provide a disc brake which ensures reliable displacement of the pads with respect to the support member and eliminates the unsteady motions of those pads with respect to the same. The object of the present invention is attained by a disc brake for braking with a rotor rotating together with a wheel, and the disc brake comprises pads, a support member, elastic member, and a caliper. The pads respectively includes a pair of first engaging portions having first slanted surfaces. The first slanted surfaces have a first distance therebetween in a direction parallel to a rotating direction of the rotor. The support member straddles the rotor and is supported on a body. The support member also includes a pair of second engaging portions respectively having second slanted surfaces. The pair of second engaging portions has a second distance therebetween in the direction parallel to the rotating direction of the rotor. The elastic member is disposed on the pads and presses the pads in a direction which shortens a third width defined by an adjacent pair of the first and second slanted surfaces, respectively. The caliper is guided by the support member and includes at least one piston which moves the pair of the pads. The first and second distances are gradually changed along the first and second slanted surfaces. Engaging protrusions are provided to one of the pairs of the first and second engaging portions, each of the engaging protrusions includes a first width in a direction parallel to a line connecting a center of the rotor and a center of each of the pads, and includes one of the first and second slanted surfaces. Engaging grooves are provided to the other of the pairs of the first and second engaging portions, each of the engaging grooves includes a second width in the direction parallel to the line connecting the center of the rotor and the center of each of the pads, the second width is wider than the first width, and includes the other of the first and second slanted surfaces.

It is also preferable that the elastic member urges the pad in the direction parallel to the line connecting the center of the rotor and the center of each of the pads.

Moreover, it is also preferable that the first and second slanted surfaces are slanted at about 30 degrees with the line connecting the center of the rotor and the center of each of the pads.

Further, it is preferable that the pad further includes a back plate and the first engaging portions are provided to the back plate.

Moreover, it is also preferable that the first and second slanted surfaces are slanted at an angle within the range of 5 to 30 degrees with respect to the line connecting the center of the rotor and the center of each of the pads.

The disc brake of the invention operates for braking as the conventional one does. In the disc brake, the support member supports the pads in a state that such unsteady motions of the pads as to generate noisy sounds are removed, and that even when the corrosive products are formed and as a result, the dimensions of the support member and the back plates of the pads are somewhat varied, the pads are reliably displaceable.

DETAILED DESCRIPTION OF THE PREFERRED EMBODIMENT

Figure 1:
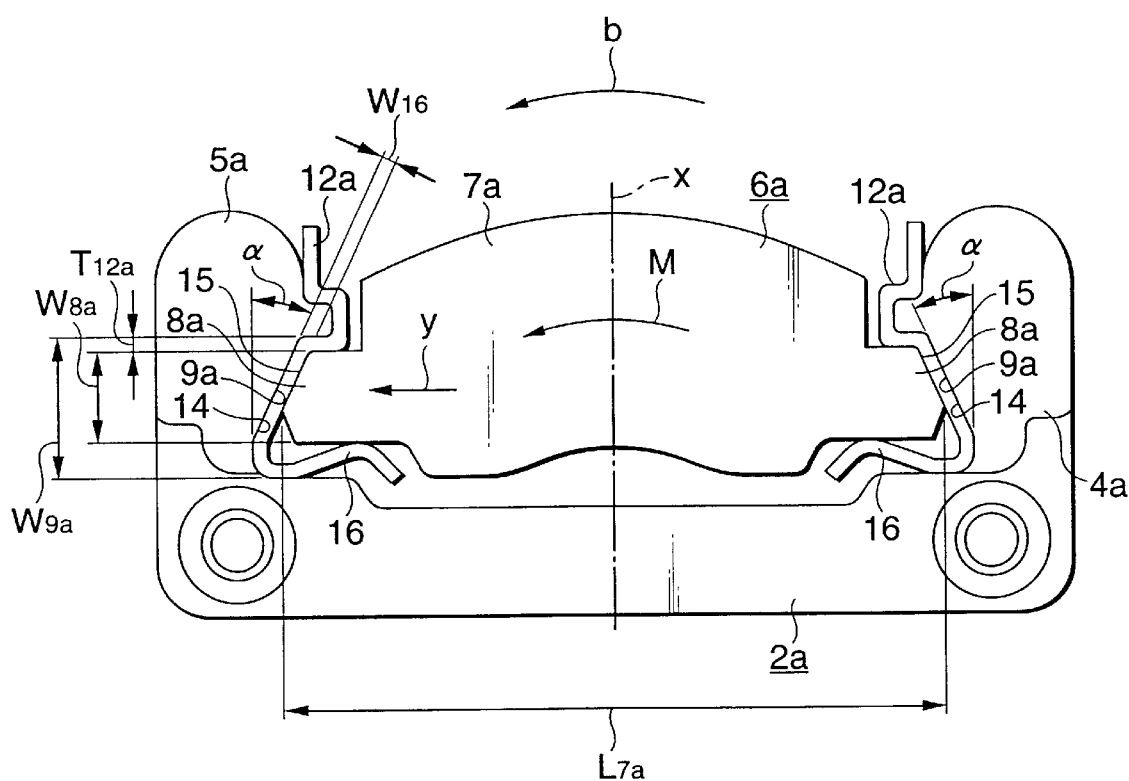
FIG. 1 is a front view showing an embodiment of a disc brake according to a first example of the present invention, some component members of the disc brake being omitted.
Figure 6:
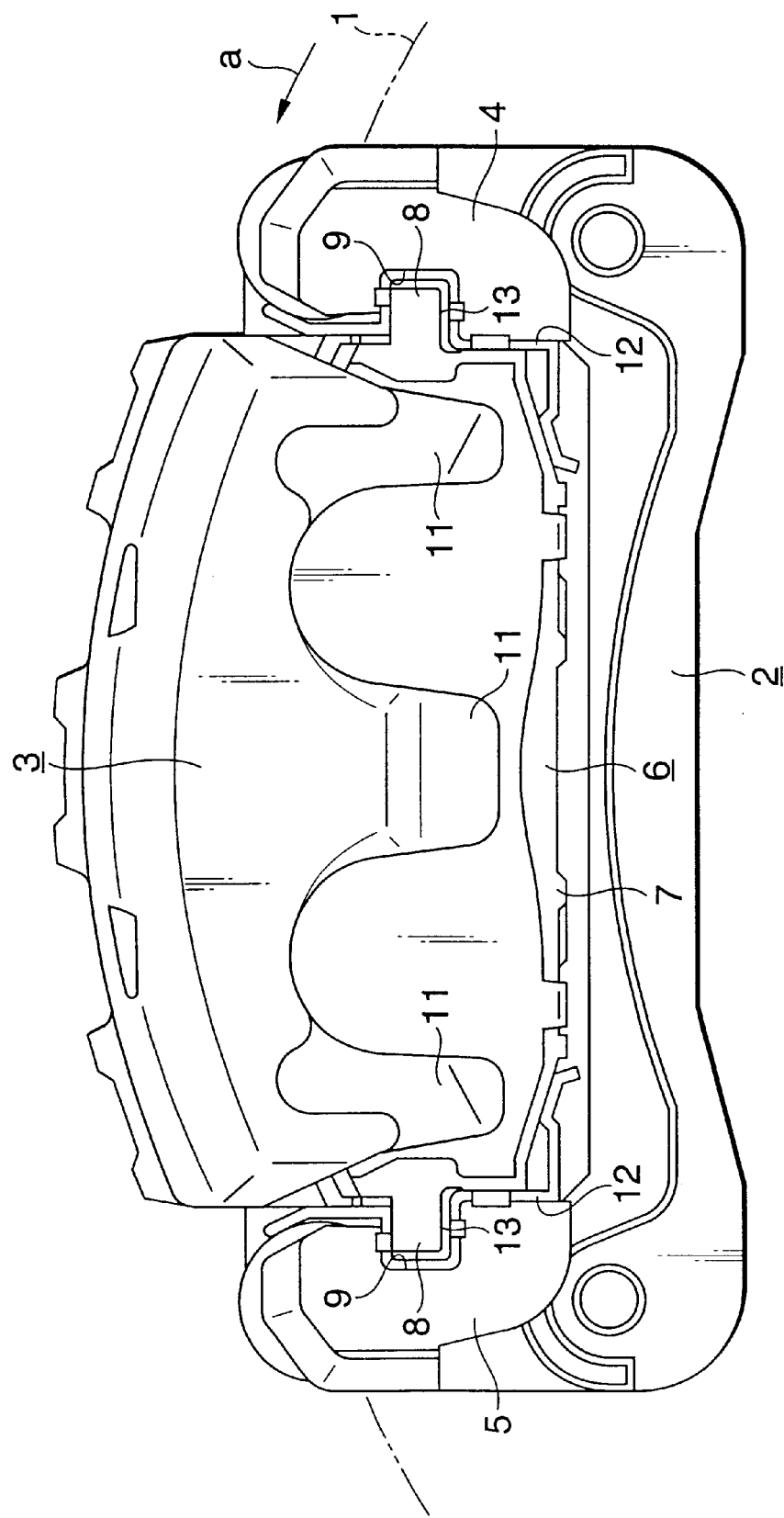
FIG. 6 is a plan view showing a structure of a conventional disc brake.
Figure 7:
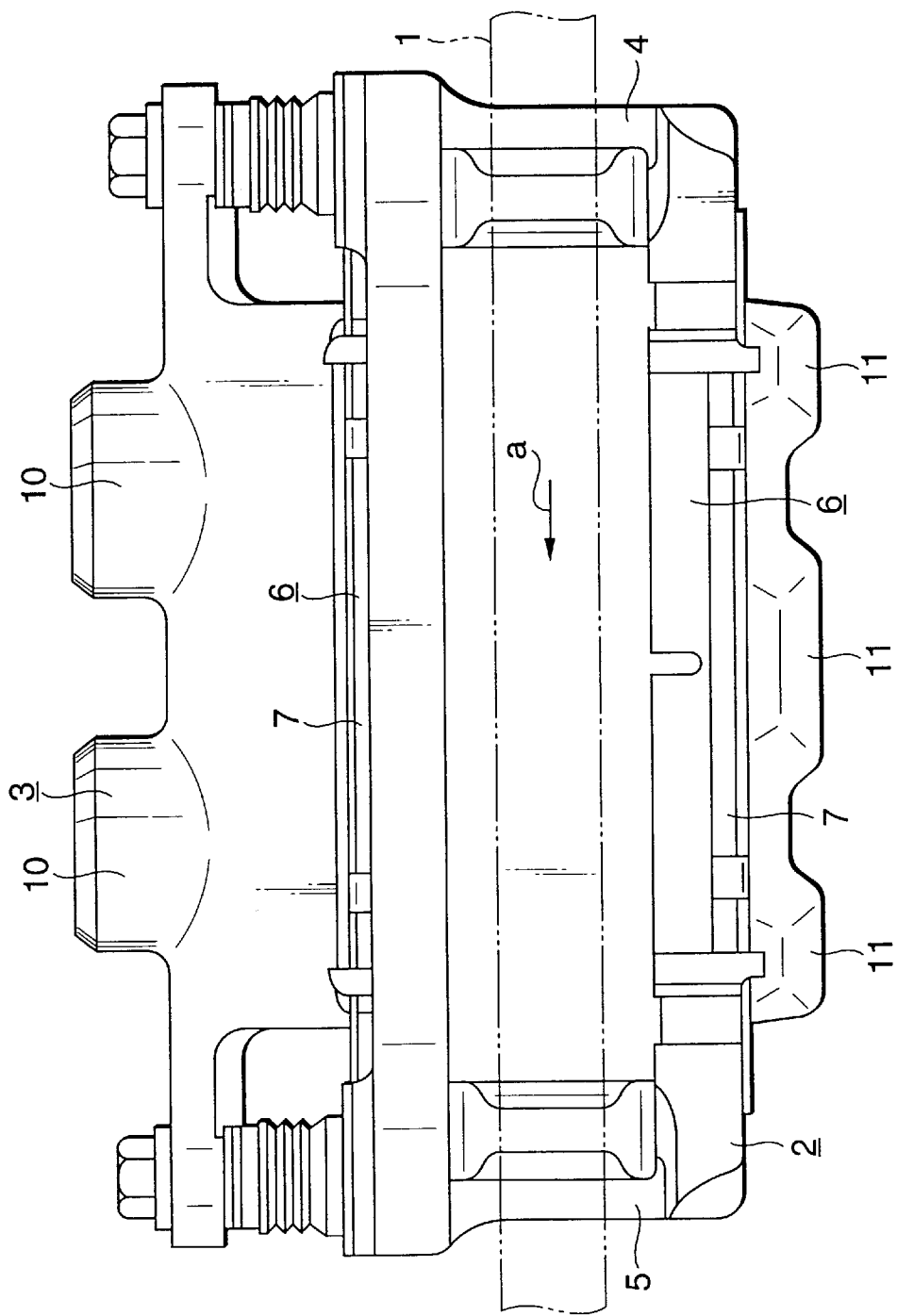
FIG. 7 is a bottom view of the disc brake shown in FIG. 6.

FIG. 1 shows a first example of an embodiment of a disc brake according to the present invention. One of the major features of the present invention resides in an improvement of a structure of the disc brake, which is provided for supporting both ends of a back plate 7a of each pad 6a on a support member 2a. The remaining structure and operations of the disc brake are substantially the same as those of each of the conventional disc brakes as shown in FIGS. 6 and 7. Therefore, embodiment description will be given while placing emphasis on the structure essential to the invention.

The support member 2a is provided straddling a rotor 1 (not shown in FIG. 1, see FIGS. 6 and 7), which rotates together with a wheel of the motor vehicle, and a run-in side support portion 4a and a run-out side support portion 5a are provided on the support member 2a. Engaging grooves 9a are formed in the run-in side support portion 4a and the run-out side support portion 5a, respectively. Engaging protrusions 8a are respectively protruded horizontally and outwardly from both ends of the back plates 7a of the pads 6a. The engaging protrusions 8a are brought into engagement with the engaging grooves 9a such that it is slidable in the axial directions (in other words, direction vertical to the drawing surface of FIG. 1) of the rotor 1. A pair of pads 6a (only one pad is illustrated in FIG. 1) are provided astride the rotor 1. Pad clips 12a as elastic members are provided respectively between the run-in side support portion 4a and the back plates 7a, and between the run-out side support portion 5a and the back plates 7a. The pad clips are made of stainless spring steels and formed by bending.

In the disc brake of this embodiment, the back end faces 14 of the engaging grooves 9a are not parallel to each other. Those back end faces 14 are oblique to the direction of a force, which is imposed on each pad 6a as the result of its friction against the corresponding side surface of the rotor 1. More specifically, the back end faces 14 are slanted at an angle $\alpha(\approx 30°$, for example) with respect to a phantom line "x" which extends in the diameter direction of the rotor 1 and passes through the center of the pad 6a. The slanting directions of the back end faces 14 are slanted such that the distance between the back end faces 14 increases from the outer side of the rotor 1 to the inner side as viewed in the diameter direction. Incidentally, the direction in which the force acts on the pad is substantially perpendicular to the phantom line "x", and is denoted as "y" in FIG. 1. The end faces 15 of the engaging protrusions 8a are slanted in parallel with the back end faces 14 of the engaging grooves 9a, as shown.

A width $W_{9a}$ of each engaging groove 9a (when viewed in the up-and-down direction in FIG. 1) is larger than a width $W_{8a}$ of each engaging protrusion 8a. Accordingly, each engaging protrusion 8a is movable within the corresponding engaging groove 9 in the up-and-down direction in FIG. 1. In this embodiment, the width $W_{9a}$ of the engaging groove 9a is selected to be somewhat larger than the sum of the width $W_{8a}$ of the engaging protrusion 8a and a value two times as large as the thickness $T_{12a}$ of the metal plate of each pad clip 12a ($W_{9a} \approx W_{8a} + 2 T_{12a} + 0.7$ mm).

An elasticity of each pad clip 12a is selected to be large enough to press the pads 6 in such a direction as to cause the back end face 14 and the end face 15, which are associated with the pad clip, to move to each other. In other words, the pad clip 12a presses the pads 6 in a direction such that width $W_{16}$ between the back end face 14 and the end face 15 becomes narrower. (In this embodiment, pressure owing to the pads 6 actually causes little change of the width $W_{16}$ because the pad clip 12a is made of spring steels, for example.) To this end, in this embodiment, the inner terminals (the lower end portions thereof in FIG. 1) of the pad clips 12a as viewed in the diameter direction of the rotor 1 are formed as elastic pieces 16 of which the elastic forces are directed outward (upward in FIG. 1). The tips of the elastic pieces 16 are brought into contact with the inner end edges of the back plates 7a of the pads 6a. The pads 6a are resiliently urged outward as viewed in the diameter direction of the rotor 1 with respect to the support member 2a. Accordingly, when no external force acts on the stricture, each back end face 14 and the corresponding end face 15 sandwich the part of the pad clip 12a in a state that no or a little gap (for example, 0 to 0.2 mm) is present between those adjacent contact surfaces thereof.

The thus constructed disc brake of this embodiment can support the pads 6a on the support member 2a in a state that the pads 6a are reliably displaceable with respect to the support member 2a even in the following situations: when a measure is taken to eliminate such an unsteady motions of the pads as to generate noisy sound, and as the result of yielding the corrosive products, the outside dimensions of the back plates 7a of the pads 6a are somewhat increased or the inside diameters of the engaging grooves 9a are somewhat reduced.

An initial mode of the disc brake will first be described. In this mode, no corrosive products are present on the end faces 15 of the engaging protrusions 8a, which are provided at both ends of the back plates 7a and the back end faces 14 of the engaging grooves 9a. In other words, the back plates 7a have the smallest outside dimensions, and the back end faces 14 have the largest clearances therebetween. Further, in the initial mode, the disc brake is not operated. In the initial mode, the pads 6a are most displaced outward as viewed in the diameter direction of the rotor 1 by the elasticity of the pad clips 12a. In this state, as already stated, each back end face 14 and the corresponding end face 15 sandwich the part of the pad clip 12a in a state that no or a little gap is present between those adjacent contact surfaces thereof. Further, the back end face 14 and the corresponding end face 15 are coupled with each other in a wedging fashion by the elasticity of the pad clips 12a. With this structure, the elasticity of the pad clips 12a, which is set to be not large, is capable of preventing the unsteady motions of the pads 6a with respect to the pads 6a and the generation of the noisy sound called rattle in the non-braking state.

Next, a state of the disc brake when it is operated for braking will be described. When the disc brake is operated, a friction of the friction member of each pad 6a against the corresponding side surface of rotor 1 imposes a force having a direction "y" of an arrow (FIG. 1) on the pad 6. The force presses the end face 15 of the pads 6a against the back end face 14 on the left side in the drawing of FIG. 1 where the run-out support portion 5a is located. It is noted that those end faces 14 and 15 are slanted with respect to the line of the force action (indicated by the arrow head line or vector "y"). As a result of relative sliding movement between the end faces 14 and 15, a force acting in the diameter direction of the rotor 1, namely, a component of the force represented by the vector "y", is generated in the pad 6a. Specifically, the direction of the component force is directed to the inner side as viewed in the diameter direction (downward in FIG. 1). By this force, the pads 6a displace while elastically deforming the elastic pieces 16, and at an inner location as viewed in the diameter direction of the rotor 1, their displacing motions are restrained by the inner surface of the engaging groove 9a and the back end face 14 thereof. Thus, if the back plates 7a are fixed by its rusting, their fixing is removed when the pads 6a move, namely, with progress of the braking operation. In this state, the side surfaces of the rotor 1 are in strong frictional engagement with the friction members of the pads 6a. Therefore, there is no chance that the pads 6a displace in the diameter direction of the rotor 1. On the run-out side of the disc brake, a gap between the back end face 14 of engaging groove 9a and the corresponding end face 15 of the engaging protrusion 8a is extremely small, 0 to 0.2 mm, as referred to above. Therefore, it never happens that the outer side of the engaging protrusion 8a, which includes the end face 15, forcibly collides with the inner side of the engaging groove 9a, which includes the back end faces 14, to thereby generate noisy sounds. When the pads 6 displace to the inner side as viewed in the diameter direction of the rotor 1, the outer side of the engaging protrusion 8a collides with the inner side of the engaging groove 9a relatively gently. Therefore, the collision is hard to generate the noisy sounds.

Description will be given about a case where corrosive products are formed on the outer surface of the engaging protrusion 8a and/or the inner surface of the engaging groove 9a of the support member 2a, and the outside dimension of the back plate 7a of the pad 6a (namely, an overall length $L_{7a}$ of the overall back plate 7a as measured in the longitudinal direction (right-and-left direction) in FIG. 1) or a width $W_{8a}$ of the engaging protrusion 8a is increased, or the inside dimension of the engaging groove 9a is reduced. When the overall length $L_{7a}$ is increased or the distance between the pair of the back end faces 14 is reduced, the end face 15 of the engaging protrusion 8a mutually and forcibly presses the back end face 14 of the engaging groove 9a. When in the braking mode, the rotor 1 is rotating in the direction "b" of an arrow, a pad couple force (indicated by a line M of an arrow in the figure, and is a force, based on a brake torque for causing the pad to rotate) acts on the pad portion 6a, and hence the pad 6a will rotate. The sliding engagement of the end faces 14 and 15 generates a component of force, which is directed to the inner side as viewed in the diameter direction of the rotor 1 (downward in FIG. 1), and the pad 6 displaces to the inner side as viewed in the diameter direction of the rotor 1 while resisting the elasticity of the pad clip 12a. As a result, the gap between the outer surface of the engaging protrusion 8a and the engaging groove 9a tends to increase, and hence the engaging protrusion 8a smoothly displaces on the inner surface of the engaging protrusion 8a irrespective of presence of the corrosive products. Also when the width $W_{8a}$ of the engaging protrusion 8a is increased or the width $W_{9a}$ of the engaging groove 9a is reduced, and the pad 6 displaces to the inner side as viewed in the diameter direction of the rotor 1 while resisting the elasticity of the pad clip 12a, whereby the smooth displacement of the engaging protrusion 8a is secured. As seen from the above description, it is required that the angle α is selected to have a value large enough to generate a component of force which can displace the pad 6a while resisting the elasticity of the pad clip 12a when the pad 6 is rusted. In the stage of design, the value of the angle α is selected in consideration of a coefficient of friction of the sliding portion. In an example where the back plates 7a are formed with steel plates and the pad clips 12a are formed with stainless steel plates, the angle α is selected to be about 50° to 40°.

Figure 2:
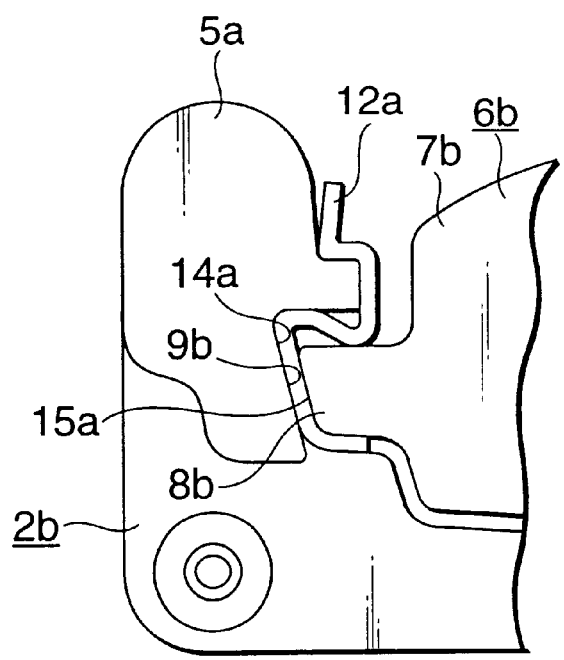
FIG. 2 is a diagram showing a part of a left end portion of the disc brake in FIG. 1, which is a second example of the embodiment.

Turning now to FIG. 2, there is shown a second example as a modification of the above-mentioned embodiment. In this example, the end face 15a of the engaging protrusion 8b and the back end face 14a of the engaging groove 9b are slanted to the side opposite to that to which those corresponding faces are slanted in the embodiment shown in FIG. 1 with respect to the phantom line "x" (see FIG. 1). Also in the disc brake having such a structure, the pads 6b may be supported on the support member 2b while securing reliable displacement of them even when the great unsteady motions of those pads large enough to generate noisy sounds is removed, and the dimensions of the back plates 7b of the pad 6b and the support member 2b are somewhat varied as the result of formation of corrosive products. The remaining structure and operations of the first modification are substantially the same as of the embodiment shown in FIG. 1. Hence, no further description of them will be given.

Figure 3:
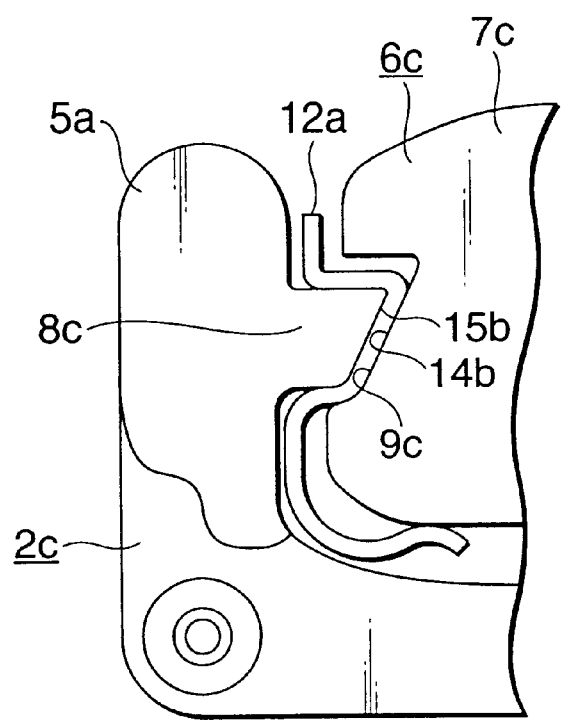
FIG. 3 is a diagram showing a part of a left end portion of the disc brake in FIG. 1, which is a third example of the embodiment.

FIG. 3 shows a third example as a modification of the embodiment shown in FIG. 1. The third example, unlike the embodiment shown in FIG. 1 and the second example, is arranged such that the engaging protrusions 8c are formed on the support member 2c, and the engaging grooves 9c are formed in the back plates 7c of the pads 6c. The end face 15b of the engaging protrusion 8c and the back end face 14b of the engaging groove 9c are slanted to the same side as of the corresponding ones in the embodiment shown in FIG. 1. Also in the disc brake having such a structure, the pads 6c may be supported on the support member 2c while securing reliable displacement of them even when the great unsteady motions of those pads large enough to generate noisy sounds is removed, and the dimensions of the back plates 7c of the pad 6c and the support member 2c are somewhat varied as the result of formation of corrosive products. Further, also in this example, the end face 15b and the back end face 14b may be slanted to the same side as of the corresponding ones in the example shown in FIG. 2. The remaining structure and operations of the first modification are substantially the same as of the embodiment shown in FIG. 1. Hence, no further description of them will be given.

Figure 4:
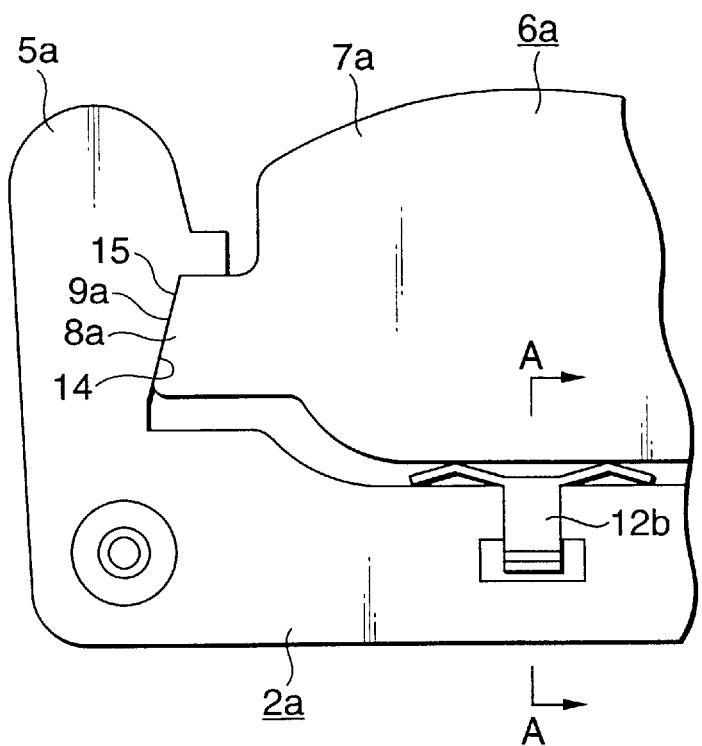
FIG. 4 is a diagram showing a part from a center portion to a left end portion of disc brake, which is a fourth example of the embodiment.
Figure 5:
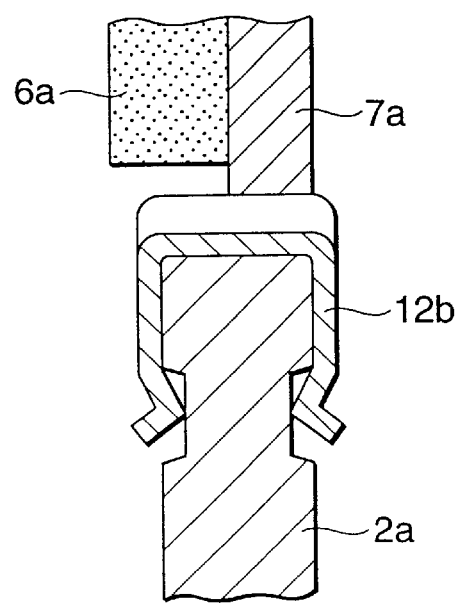
FIG. 5 is a cross sectional view taken on line A—A in FIG. 4.

FIGS. 4 and 5 show a fourth example as a modification of the embodiment shown in FIG. 1. In this example, a pad clip 12b is placed at a mid position of a support member 2a in connection with the related pad 6a, as shown. The pad clips 12b urge the pads 6a outward in the diameter direction of the rotor 1 (see FIGS. 6 and 7). The pad clips that are respectively provided at the run-in and run-out sides of the disc brake (as described in the first to third examples) are not used in this modification. Also, in the thus constructed disc brake, the pads 6a are reliably displaced with respect to the support member 2a, and the unsteady motions of the pads 6a are effectively removed.

As seen from the foregoing description, the disc brake thus constructed and operated is capable of reliably displacing the pads with respect to the support member, and effectively removing the unsteady motions of the pads. In this respect, the present invention succeeds in realizing a brake structure that is reliable free from generation of noisy sounds.

While only certain embodiments of the invention have been specifically described herein, it will be apparent that numerous modifications may be made thereto without departing from the spirit and scope of the invention.

The present invention is based on Japanese Patent Application No. Hei. 10-313532 which is incorporated herein by reference.

What is claimed is:

1. A disc brake for braking with a rotor rotating together with a wheel, said disc brake comprising:
   a pair of pads respectively including a pair of first engaging portions, said first engaging portions respectively having first slanted surfaces, the pair of said first slanted surfaces having a first distance therebetween in a direction parallel to a rotating direction of the rotor;
   a support member which straddles the rotor and is supported on a body, said support member including a pair of second engaging portions respectively having second slanted surfaces having a second distance therebetween in the direction parallel to the rotating direction of the rotor;
   at least one elastic member disposed on said pads and pressing said pads in a direction which shortens a third width defined by an adjacent pair of said first and second slanted surfaces, respectively; and
   a caliper guided by said support member and including at least one piston which moves the pair of said pads,
   wherein said first and second distances are gradually changed along said first and second slanted surfaces,
   engaging protrusions are provided to one of the pairs of said first and second engaging portions, each of said engaging protrusions includes a first width in a direction parallel to a line connecting a center of the rotor and a center of each of said pads, and includes one of said first and second slanted surfaces, and
   engaging grooves are provided to the other of the pairs of said first and second engaging portions, each of said engaging grooves includes a second width in the direction parallel to the line connecting the center of the rotor and the center of each of said pads, said second width is wider than said first width, and includes the other of said first and second slanted surfaces, said engaging protrusions being received within said engaging grooves.

2. The disc brake according to claim 1, wherein said elastic member urges said pad in the direction parallel to the line connecting the center of the rotor and the center of each of said pads.

3. The disc brake according to claim 1, wherein said engaging protrusions are provided to said first engaging portions of said pads, and said engaging grooves are provided to said second engaging portions of said support member.

4. The disc brake according to claim 3, wherein said first and second distances become smaller closer to the center of the rotor.

5. The disc brake according to claim 3, wherein said first and second distances become larger closer to the center of the rotor.

6. The disc brake according to claim 3, said pad further including a back plate, wherein said first engaging portions are provided to said back plate.

7. The disc brake according to claim 1, wherein said engaging protrusions are provided to said second engaging portions of said support member, and said engaging grooves are provided to said first engaging portions of said pads.

8. The disc brake according to claim 7, wherein said first and second distances become smaller in the direction parallel to the line connecting the center of the rotor and the center of each of said pads.

9. The disc brake according to claim 8, wherein said first and second distances becomes larger in the direction parallel to the line connecting the center of the rotor and the center of each of said pads.

10. The disc brake according to claim 1, further comprising at least one pad clip including said elastic member and disposed between said pad and said support member.

11. The disc brake according to claim 1, wherein said elastic member is disposed between the center of the rotor and the center of said pad.

12. The disc brake according to claim 1, wherein said elastic member is made of stainless spring steel.

13. The disc brake according to claim 12, wherein said first and second slanted surfaces are slanted at an angle within the range of 5 to 30 degrees with respect to the line connecting the center of the rotor and the center of each of said pads.

* * * * *